Jan. 15, 1929.
A. G. F. KUROWSKI
1,698,817
TYPEWRITING MACHINE
Filed Nov. 26, 1926
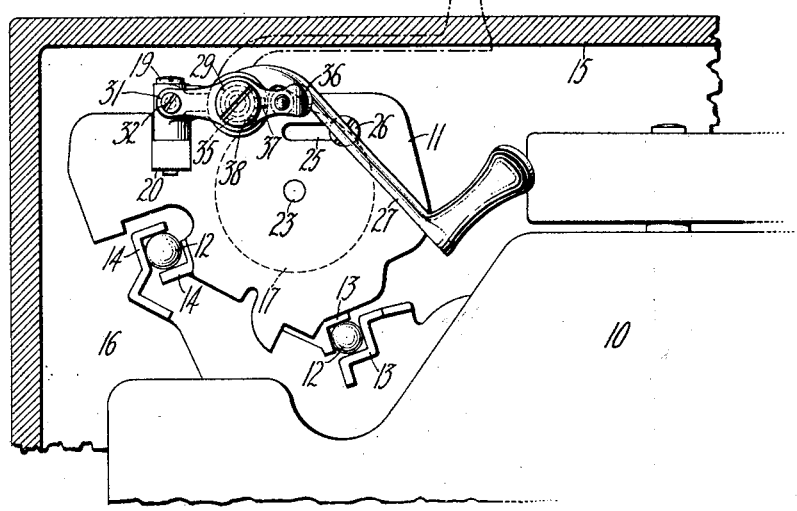
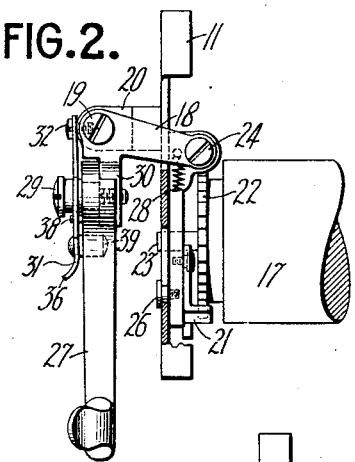
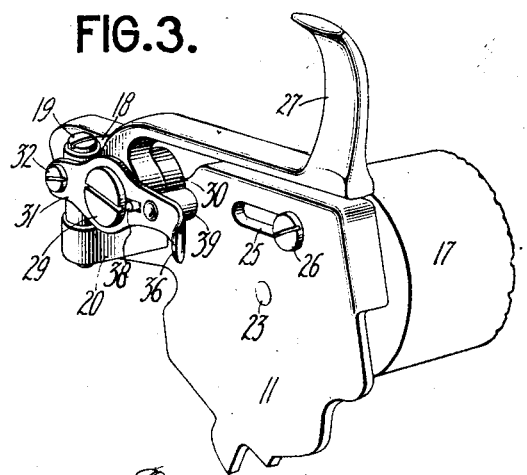
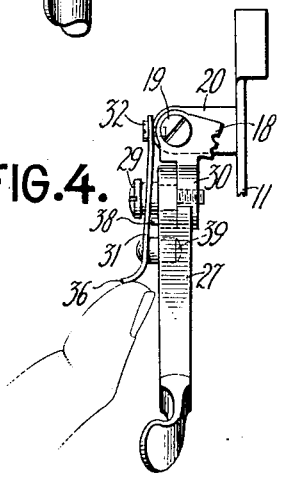
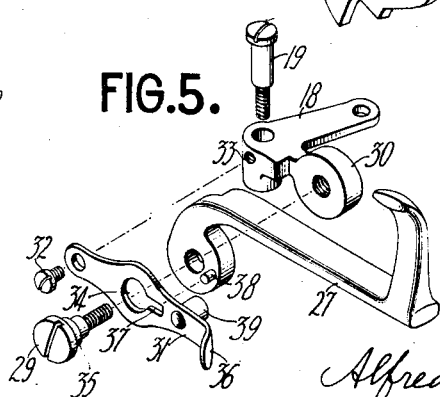
INVENTOR:
Alfred G. F. Kurowski
BY D. C. Stickney
ATTORNEY.

Patented Jan. 15, 1929.

1,698,817

UNITED STATES PATENT OFFICE.

ALFRED G. F. KUROWSKI, OF BROOKLYN, NEW YORK, ASSIGNOR TO UNDERWOOD ELLIOTT FISHER COMPANY, OF NEW YORK, N. Y., A CORPORATION OF DELAWARE.

TYPEWRITING MACHINE.

Application filed November 26, 1926. Serial No. 150,768.

This invention relates to improvements in the line-spacing mechanism of typewriting machines designed to be placed in a traveling casing, which it is desirable to make very narrow. To this end the typewriter is usually made very low, by lowering the fulcrum-points of the type-bars and by sinking the carriage so that the upper edge thereof will be on a level with stationary mechanism of the machine.

The carriage is operated by a line-space lever terminating with a finger-piece or handle, which travels with the carriage, and must, of course, be built so as to clear the stationary mechanism of the machine. When this lever is made strong enough to withstand hard usage, the handle thereof stands much higher than any of the other parts of the machine, and the cover of the casing must be made high enough to clear the line-space lever. This makes the casing too high and awkward to handle and to carry around. It is one of the features of this invention to provide an improved handle which may be folded below the level of the highest part of the machine to the end that the machine may be packed in a more compact casing.

Another feature of this invention relates to the provision of means whereby the handle may be locked in operating position, so as to insure against accidental displacement thereof which would be liable to cause damage to the delicate mechanism of the machine.

The line-space lever is pivotally mounted on a fixed stud carried by the carriage and is operatively connected with a sliding pawl which operates a line-spacing ratchet. The lever is provided with a swiveled handle which is normally locked in operating position by means of a latch. The latch is manually released so that the handle may be swung to its folded position.

Other features and advantages will hereinafter appear.

In the accompanying drawings,

Figure 1 is a cross-sectional view, in elevation, showing the handle folded and the machine in a traveling casing.

Figure 2 is a plan view of the line-spacing mechanism, showing the handle in operative position.

Figure 3 is a perspective view, showing the handle locked in operative position.

Figure 4 is a view similar to that shown in Figure 2 but shows how the handle is folded.

Figure 5 is a dismembered view, showing some of the parts of the line-spacing mechanism.

The present invention is illustrated as applied to an Underwood four-bank portable typewriting machine, but may be used to advantage with any type of portable machine which is to be accommodated in a compact casing.

Said machine has a frame 10 which is built very low, and is provided at the rear thereof with a carriage 11, slidably mounted by means of antifriction bearings 12 in guideways 13 and 14. The carriage is sunk in the machine-frame as shown in Figure 1, but the upper edge thereof stands higher than any other part of the machine and determines the position of a top wall 15 of a casing 16.

In order to return the carriage 11 to line-starting position, and in order to, at the same time, line-space a platen 17 carried by the carriage, the machine is provided with a rocking lever 18 pivotally mounted on a stud 19 which is secured to a carriage-lug 20. The lever 18 is connected by means of an intervening pawl 21 to a line-space ratchet 22 carried by a platen-axle 23. The pawl is loosely connected to the lever by means of a stud 24 and is slidably mounted in a slot 25 in the carriage-end plate, by means of a shoulder-screw 26.

The lever 18 is operated by a handle 27, which is foldable when not in use, as shown in Figure 1, so that the uppermost edge of a finger-piece, at the end thereof, may clear the top wall of the casing. The handle is rockably mounted on a shoulder-screw 29 carried by an extension 30 of the lever 18. The lever 18 is returned to its normal position after each movement of the handle by a spring 28.

In order to prevent accidental displacement of the handle 27, there is provided a resilient locking plate 31 which is secured to the lever 18 by a screw 32 in a threaded hole 33 in said lever. The plate 31 has a hole 34 therein for embracing an enlarged diameter 35 of the screw 29 and a slot 37 for receiving a pin 38 carried by the handle. When the plate is in its normal position, interposing the pin, it is impossible to swing the handle to inoperative position.

The handle may, however, be lowered to ineffective or folded position by swinging the plate 31, which is provided with a finger-piece 36, out of engagement with the pin 38 as shown in Figure 4. Then the handle will by its own weight fall into folded position, in which position it is held by a stud 39 carried by the plate and in the path of the handle.

Variations may be resorted to within the scope of the invention, and portions of the improvements may be used without others.

Having thus described my invention, I claim:

1. A line-spacing mechanism for a typewriting machine, including a pivotally-mounted lever, a foldable handle carried by said lever, means for locking the handle in operating position, said means including a locking plate carried by said lever, said plate having a hole therein for receiving a pin carried by the handle, and a finger-piece on said plate for manually releasing it from said pin.

2. A carriage-return lever for a portable typewriting machine, said lever having a foldable handle and means for locking the handle in operating position, said means including a resilient finger-piece carried by the lever, means on the handle for engaging the finger-piece, and a stud on the finger-piece for supporting the handle in its folded position.

3. A carriage-return lever for a typewriting machine, said lever having a foldable handle pivotally mounted on a stud fast thereto, and means for locking the handle in operating position, said means including a locking plate fast to said lever, the plate having a hole therein for embracing the stud, a pin projecting from the handle, said locking plate having an aperture for receiving said pin, and a finger-piece on said locking plate for manually releasing the same from engagement with said pin.

4. A carriage-return lever for a typewriting machine, said lever having a foldable handle pivotally mounted on a stud fast thereto, means for locking the handle in operating position, said means including a locking plate fast at one end to said lever, the plate having a hole therein for embracing the stud, and having an aperture for receiving a pin carried by the handle, and means for positioning the handle in its folded or ineffective position, said last-mentioned means including a pin carried by the locking plate adjacent its free end, said pin being arranged to interpose the body of the handle.

5. A portable typewriter including the combination with a platen-carriage, a platen and line-spacing mechanism therefor, of a bell-crank lever having a short lever-arm member for operating said line-spacing mechanism, said member being vertically pivoted on the platen-carriage and having an integral extension in front of said vertical pivot, which extension carries a horizontal pivot, a long lever-arm provided with a handle at its outer end and having its inner end mounted on said horizontal pivot, a spring-locking plate for holding said long lever-arm in position for operating the carriage-return and line-spacing mechanism, said spring being provided with an aperture to embrace said horizontal pivot and having one end fast to said short lever-arm member, and a pin on said spring-plate adjacent its free end arranged to interpose the body of the long lever-arm when it has been released from its operating position and swung downwardly on said horizontal pivot to an inoperative folded position.

ALFRED G. F. KUROWSKI.